United States Patent [19]

Geimer

[11] 4,393,019

[45] Jul. 12, 1983

[54] METHOD OF PRESSING RECONSTITUTED LIGNOCELLULOSIC MATERIALS

[75] Inventor: Robert L. Geimer, Verona, Wis.

[73] Assignee: The United States of America as represented by the Secretary of Agriculture, Washington, D.C.

[21] Appl. No.: 326,086

[22] Filed: Nov. 30, 1981

[51] Int. Cl.[3] .............................................. B29J 5/02

[52] U.S. Cl. .................................... 264/83; 264/109; 264/128

[58] Field of Search .................. 264/82, 83, 109, 120, 264/128

[56] References Cited

U.S. PATENT DOCUMENTS

| | | | |
|---|---|---|---|
| 3,280,237 | 10/1966 | Corbin et al. | 264/109 |
| 3,699,202 | 10/1972 | Verbestel | 264/109 |
| 3,891,738 | 6/1975 | Shen | 264/101 |

FOREIGN PATENT DOCUMENTS

| | | |
|---|---|---|
| 2058820 | 11/1970 | Fed. Rep. of Germany . |
| 1262313 | 2/1972 | United Kingdom . |

OTHER PUBLICATIONS

Shen, Forest Products Journ. 23 (3) pp. 21-29 (1973).

Stegmann et al., Journ. of Forestry and the Lumber Industry 94 (23) pp. 361-368 (1968).

*Primary Examiner*—Lorenzo B. Hayes
*Attorney, Agent, or Firm*—M. Howard Silverstein; David G. McConnell

[57] ABSTRACT

A method of producing reconstituted wood boards in a conventional press by introducing saturated steam through apertured press platens into a partially-compressed mat, composed of lignocellulosic material and a thermosetting resin binder, under specified conditions of mat density. Use of saturated steam in this manner allows production of a reconstituted wood board with shorter total press time than usual and with a more efficient use of energy. In addition total press time can be further reduced by injecting a gaseous catalyst into the mat to speed the cure of the thermosetting resin binder.

8 Claims, 1 Drawing Figure

METHOD OF PRESSING RECONSTITUTED LIGNOCELLULOSIC MATERIALS

BACKGROUND OF THE INVENTION (1) Field of the Invention:

This invention pertains to a method for the production of reconstituted wood boards. More particularly this invention pertains to a method whereby particleboard or fiberboard can be produced in a press by introducing saturated steam into a partially compressed mat consisting of lignocellulosic material mixed with thermosetting resin binder, causing a sudden rise in interior mat temperature without a corresponding increase in mat moisture content, thereby allowing a reduction in pressing time.

(2) Description of the Prior Art:

In the production of boards from reconstituted wood a thermosetting resin binder is mixed with wood fibers or particles to form a mat. The mat is then placed between two platens and pressed into the composite panel. During pressing, heat is supplied to the mat to plasticize it, thereby making the mat easier to compress, and also to cure the thermosetting resin binder. The time spent in pressing is the major "bottleneck" in the production of particleboard, and to a large extent is dependent on the mechanism of heat transfer used to supply heat to the mat.

In conventional pressing of reconstituted wood heat is transferred to the mat by conduction from heated platen surfaces. This method requires some time to raise the mat's core temperature to a level sufficient to cure the thermosetting resin binder and to complete the panel formation. This is particularly a problem with thick mats because press time does not vary linearly with mat thickness.

Attempts have been made to reduce press time in conduction pressing by increasing the temperature of the platens. However, only slight reductions in press time were achieved, and increased platen temperature also resulted in burning the panels.

In contrast to conduction pressing, reductions in press time have been achieved by transferring heat to mats convectively, thereby taking advantage of the natural porosity of the mats. Convective heating effects cures of mat thicknesses not possible with conduction pressing. A well-known method using convective heat transfer is the "steam shock" or "steam jet" technique wherein mats laden with surface moisture are contacted with hot platens which vaporize the water. The steam thus created moves quickly toward the center of the mat, thereby raising the core temperature. As more water is used, the core temperature will increase. However, more press time is then required to rid the mat of excess moisture, and the surface of the panel often blisters.

Later methods introduce steam directly into the mat to convect heat. One method passes low-pressure steam through the mat from one edge to the other. However, temperature and moisture gradients develop along the direction of steam flow, and these gradients can result in panel warpage. In addition the maximum mat center temperature on the discharge side is 212° F., which will not cure some thermosetting resins.

To reach higher mat temperatures and to prevent moisture formation by steam condensation another method (see Corbin et al U.S. Pat. No. 3,280,237) passes superheated steam from a top, apertured platen through a partially compressed mat. The pressure differential created by high steam injection pressures allows evacuation of the steam to the atmosphere through the edges of the mat. However, using superheated steam for the commercial production of reconstituted wood boards rather than using lower quality steam is expensive due to increased equipment costs for superheaters and increased energy costs to add heat to lower quality steam.

Another method describes a continuous press for producing particleboard wherein superheated steam is injected into a partially compressed mat from gas-permeable conveyor belts and then exhausted to the atmosphere from the edges of the mat. However, as described previously, the use of superheated steam makes the press operation more costly and incurs higher energy losses than would the use of lower quality steam such as saturated steam.

Recently, a method (see Shen U.S. Pat. No. 3,891,738) has been proposed wherein saturated steam under pressure is introduced into a mat which has been compressed to its final desired thickness. The steam is injected through an apertured platen on one side of the mat and exhausted through another apertured platen on the other side of the mat. The mat is confined in a sealed chamber, and an intricate network of passageways and valves restricts the exhaust. By these means high temperatures and pressures are maintained in the chamber. However, this method adds complicated equipment and expense to the press operation in order to insure a tight seal. Furthermore, compressing the mat to its final thickness prior to injecting steam is energy inefficient for two reasons. First, mat porosity is thereby diminished, consequently hindering steam flow between wood flakes and reducing convective heat transfer. Second, high pressure is needed to close the press when the mat has not first been plasticized by steam injection; when a mat has been plasticized first, the required closing pressure is much less, and consequently less energy is consumed.

Press time can also be reduced by catalyzing the reaction between constituents of the thermosetting resin binder and hence speeding its cure. One method adds a gaseous catalyst and resin binder constituents to a fluidized bed of lignocellulosic material. The binder is then formed during subsequent hot pressing of the material. However, this method is limited to catalyst addition prior to mat formation. Therefore, this method cannot be used as a means to add catalyst during pressing of the mat.

SUMMARY OF THE INVENTION

The invention is a method for producing reconstituted wood boards. A mat consisting of lignocellulosic material mixed with thermosetting resin binder is compressed to less than a specified density. Saturated steam is then introduced into the mat through heated apertured platens located on top and below the mat. Simultaneously, the mat is compressed at a rate such that a specified mat core temperature is reached before the mat reaches a second, specified density. Following this, the mat is compressed to the desired thickness while the steam flow is continued for a short period until maximum mat core temperature is reached. The mat is held in the press until the resin is cured. In addition, a gaseous catalyst may be injected during pressing to provide a sudden resin cure.

Accordingly, an object of this invention is to provide a method for reducing press time during the production of reconstituted wood boards. A further object of this invention is to provide economical and energy-efficient heat to a mat during pressing. A final object of this invention is to provide a method whereby a gaseous catalyst can be injected into the mat during pressing to provide a sudden cure of the thermosetting resin binder.

DESCRIPTION OF THE PREFERRED EMBODIMENTS

Figure 1:
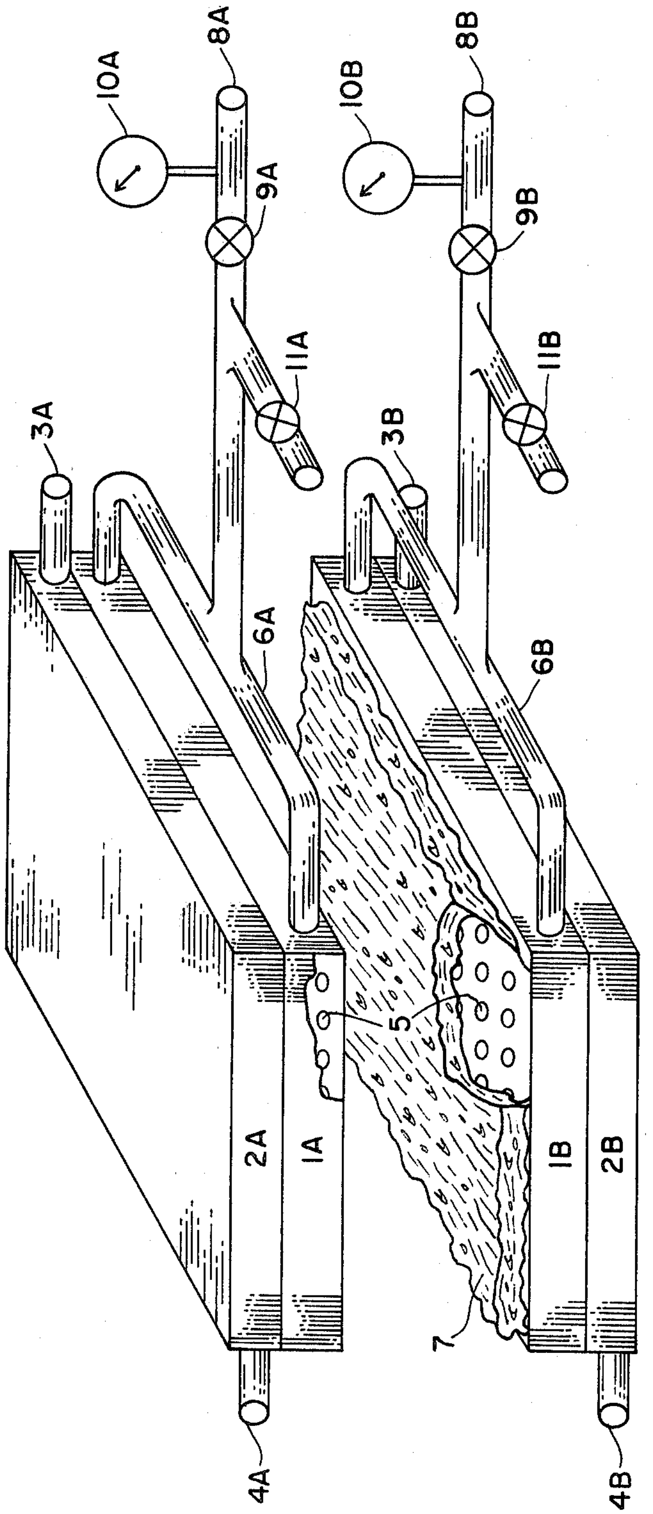
FIG. 1 is a schematic diagram of the apparatus used to press and steam the mat.

Methods to press particleboard have heretofore been slow and have also been ineffective for producing thick boards. Furthermore, methods which have achieved a reduction in press time have been expensive and energy inefficient. These problems have been overcome by the method described herein because it is effective for any board thickness, adaptable to existing presses and is energy efficient.

FIG. 1 shows typical equipment modified for use in pressing particleboard. The equipment is adaptable for either single-or multiopening presses.

Referring to FIG. 1, the apparatus comprises a pair of platens 1A and 1B, which can be moved relative to one another by means not shown. Platens 1A and 1B are heated by a pair of backup platens 2A and 2B through which steam or hot oil flows by means of inlet pipes 3A and 3B and outlet pipes 4A and 4B. The inner faces of platens 1A and 1B have a plurality of apertures 5 connected to a steam source by means of manifolds 6A and 6B so that steam flows through the apertures 5 into the mat 7.

The steam flows into manifolds 6A and 6B from inlet pipes 8A and 8B, respectively. The flowrate is controlled by valves 9A and 9B. Steam line pressure is measured by gauges 10A and 10B when control valves 9A and 9B are closed. A gaseous catalyst can be introduced into the mat through valves 11A and 11B by way of the steam lines 8A and 8B and manifolds 6A and 6B.

The process relates to the production of reconstituted wood boards using lignocellulosic material such as wood particles, fibers, or flakes as the primary material bonded together by a thermosetting resin. Suitable thermosetting resins are urea-formaldehyde or phenol-formaldehyde, although other resins can be used. Cure of the resin can be sped up by adding a gaseous catalyst appropriate for the resin used. Examples of a catalyst which is appropriate for urea-formaldehyde resin is sulfur dioxide ($SO_2$). Phenol-formaldehyde resins may be catalyzed with ammonia and strong amines such as trimethylamine.

In operation, the lignocellulosic material is first treated with a thermosetting resin and formed into a mat. The mat moisture content can range from 4 to 18 percent, but preferably it will be 8 percent. The mat is then placed in the press between the two apertured platens 1A and 1B which apertured platens 1A and 1B are located between two normal platens 2A and 2B through which steam or hot oil flows at a rate such that the apertured platens are maintained at a temperature of at least 250° F. but preferably 375° F.

The mat is then compressed to a density of less than 26 to 28 pounds per cubic foot, and saturated steam is injected into the mat through apertured platens 1A and 1B. By introducing steam prior to the mat's reaching a density of about 26 to 28 pounds per cubic foot the steam can penetrate between the particles, flakes, or fibers and actually create or open up permanent paths by which heat can be transferred by convection to the center of the board. The exact mat density at the time of steam introduction may vary below the upper limit of 26 to 28 pounds per cubic foot but should be great enough to prevent the steam's blowing the lignocellulosic material out of the press as the steam escapes through the edges of the mat.

Simultaneous to steam injection the mat is further compressed at a rate such that a mat centerline temperature of at least 212° F. will be reached before the mat achieves a density of from 34 to 36 pounds per cubic foot; if this is not done, steam condensation will result, and the mat centerline will not later reach a temperature sufficient to cure the thermosetting resin binder.

Once the mat centerline temperature and mat density conditions have been met, the mat is compressed still further while maintaining the steam flow, until a desired final mat density is reached. Steaming will then be continued for a length of time sufficient for the mat to reach a maximum centerline temperature in the range from 240° F. to 350° F; the length of time will be from 2 to 60 seconds. After this, steam injection is ended, and the mat is maintained between the apertured platens for a length of time sufficient to cure the thermosetting resin binder; this length of time will be from 10 to 180 seconds, depending on board thickness.

If desired, a gaseous catalyst can be injected into the mat to hasten the cure of the thermosetting resin binder. The particular step in the process at which catalyst should be added will vary with the type resin used. The catalyst can be added by way of the steam line-manifold system or can be added in a separate system.

EXAMPLE 1

Two-inch flakes of Douglas-fir were treated with urea formaldehyde and formed into a mat having 8 percent moisture content. The mat was placed in the press between apertured platens maintained at 375° F. and in 16 seconds was compressed to a mat density of 22 pounds per cubic foot, at a press closing rate of 15 inches per minute.

At that point saturated steam having a line pressure of 200 pounds per square inch gage was introduced into the mat. Pressing continued simultaneous to the steaming for 4 seconds, at which time the mat achieved the desired final density of 40 pounds per cubic foot, corresponding to a board thickness of ½ inch. Steaming was continued for 5 seconds after final press closure. A maximum centerline temperature of 270° F. was achieved. After steaming ceased the press remained closed for 22 seconds to effect a cure of the urea-formaldehyde binder. Finally, the press was slowly opened during a period of 3 seconds to allow for a controllable internal board pressure drop. Therefore, ½-inch Douglas-fir flakeboard having a density of 40 pounds per cubic foot was produced after a total of 50 seconds' press time.

EXAMPLE 2

As in Example 1, 2-inch flakes of Douglas-fir were treated with urea formaldehyde and formed into a mat having 8 percent moisture content. The mat was further processed under the conditions described in Example 1 except that, during the 5-second period after final press closure, sulfur dioxide ($SO_2$) was introduced into the mat to catalyze the curing reaction of the urea-formaldehyde resin. The resin was cured in 12 seconds as compared with 22 seconds (Example 1). Therefore, after 40 seconds of total press time, a ½-inch Douglas-fir flakeboard was produced having a density of 40 pounds per cubic foot. This is a reduction of 10 seconds from the total press time (50 sec) required to produce the same size and type fiberboard under similar conditions in Example 1.

What is claimed is:

1. A method of producing a panel or the like from a mat formed of lignocellulosic material and a thermosetting resin binder in a press including a pair of heated platens wherein each platen has apertures opening to one surface thereof which is adjacent to the other platen, the improvement comprising the steps of:

a. compressing the mat between the apertured platens to a density of less than about 26 to 28 pounds per cubic foot;

b. introducing saturated steam into the mat through apertures of both apertured platens and simultaneously further compressing the mat between the apertured platens at a rate such that a mat centerline temperature of at least 212° F. is reached before the mat achieves a density of from 34 to 36 pounds per cubic foot and permitting the steam to escape through the edges of the mat;

c. continue compressing the mat between the apertured platens while maintaining the steam flow, until a desired final mat density is reached;

d. continue steaming the mat for a length of time sufficient for the mat to reach a maximum centerline temperature; and e. maintaining the mat between the apertured platens for a length of time sufficient to cure the thermosetting resin binder.

2. The method of claim 1 wherein the length of time sufficient for the mat to reach the maximum core centerline temperature is from 2 to 60 seconds.

3. The method of claim 2 wherein the length of time sufficient to cure the thermosetting resin binder is from 10 to 180 seconds.

4. The method of claim 1, further comprising the step of:

f. introducing a gaseous catalyst into the mat so as to accelerate the cure of the thermosetting resin binder.

5. A method in accordance with claim 1 wherein the initial mat moisture content is in the range of 4 to 18%.

6. A method in accordance with claim 1 wherein said platens are heated to a temperature of at least 250° F. at the time said mat is compressed to a density of less than about 26 to 28 pounds per cubic foot.

7. A method in accordance to claim 1 wherein the initial mat moisture content is about 8%, and wherein said platens are maintained at a temperature of approximately 375° F. at the time said mat is compressed to a density of less than about 26 to 28 pounds per cubic foot.

8. A method in accordance with claim 1 wherein said maximum centerline temperature is 240° F.–350° F.

* * * * *